Sept. 27, 1960 N. J. SHEERAN Re. 24,881

LAMINATING ADHESIVE AND METHOD OF PRODUCING THE SAME

Original Filed April 1, 1957

NORMAN J. SHEERAN
*INVENTOR.*

BY Smith + Tuck

United States Patent Office

Re. 24,881
Reissued Sept. 27, 1960

24,881

LAMINATING ADHESIVE AND METHOD OF PRODUCING THE SAME

Norman J. Sheeran, Seattle, Wash., assignor to American-Marietta Company, Chicago, Ill., a corporation of Illinois Original No. 2,870,034, dated Jan. 20, 1959, Ser. No. 649,758, Apr. 1, 1957. Application for reissue Apr. 27, 1959, Ser. No. 809,326

11 Claims. (Cl. 106—124)

Figure 1:
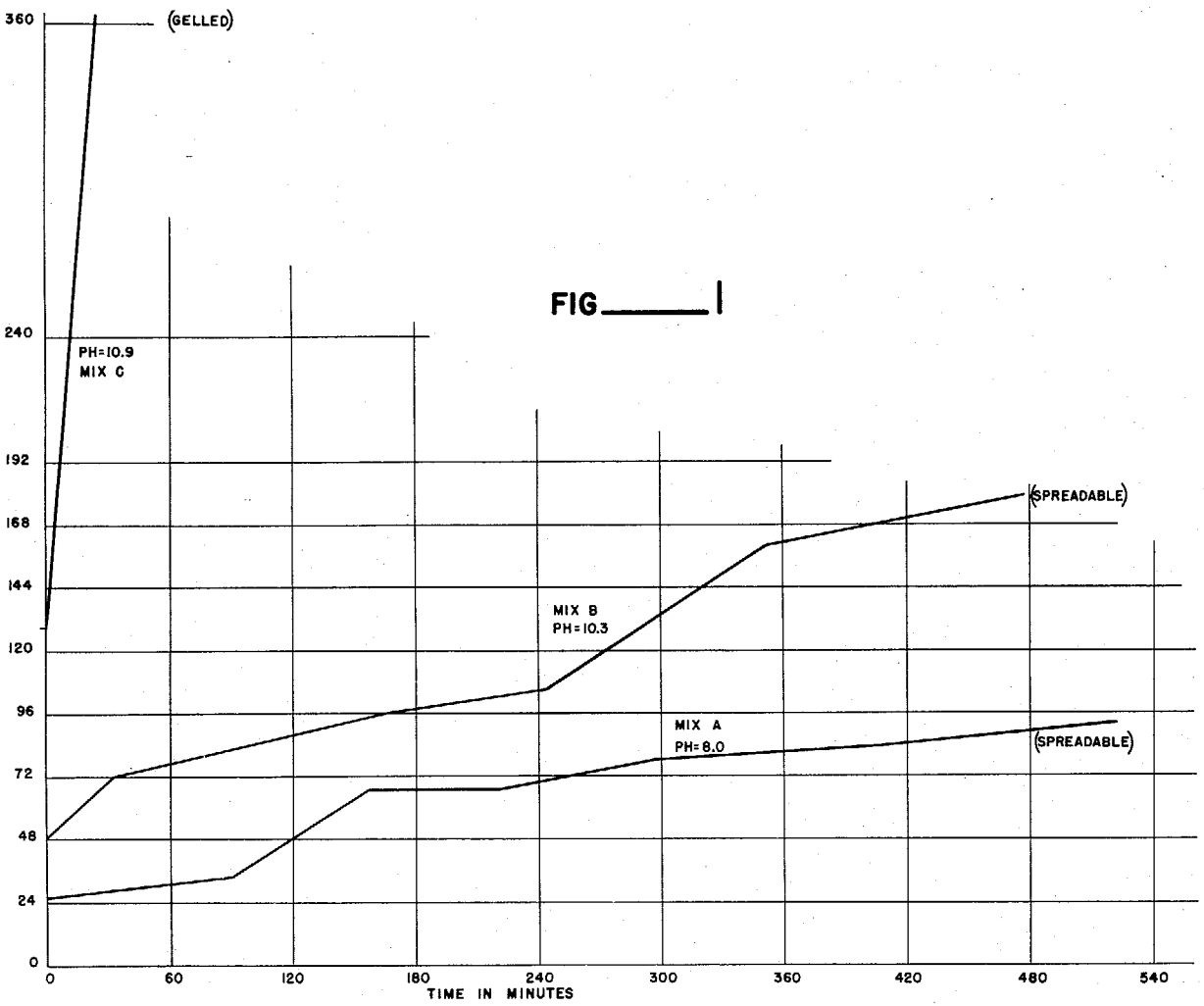

Matter enclosed in heavy brackets [ ] appears in the original patent but forms no part of this reissue specification; matter printed in italics indicates the additions made by reissue.

This invention relates to improvements in a laminating adhesive and the method of producing the same; and, more particularly, is concerned with a new protein base adhesive suitable for producing paper-to-paper and paper-to-wood laminations in high speed continuously operating laminating machinery. A typical example of an application of this invention is found in the field where paper-skins are bonded to each side of a piece of wood veneer. The composite laminate thus produced is primarily used for manufacturing boxes and the like, where a high-strength weight ratio is desirable, and substantial water resistance is a requirement.

In laminating machines of the type mentioned a fast-curing adhesive is necessary, high water resistance is desirable, and the adhesive must be one which can be applied to the paper webs, or paper skin, by customary glue-coating rolls. It is also desirable that the adhesive be low in cost, and one which will provide a high strength bond.

A primary object of this invention is to provide an adhesive producing these desirable results in which the wet phase of the adhesive is maintainable over a protracted time period but the adhesive is converted into the desired bond through the application of momentary heat to a laminated assembly.

A typical paper skin material is 42-lb. kraft linerboard, a paper weighing approximately 42 pounds per thousand square feet. Such a paper is approximately 0.01 inch thick. The wood veneer with which considerable experience has been had is derived from Douglas fir logs and normally varies between one-tenth and three-sixteenth inches in thickness. With such relatively thin paper it is necessary that the adhesive exhibit rapid setting characteristics as otherwise the adhesive is apt to bleed through the thin paper face, to discolor and disfigure the same. At the same time it is necessary to have sufficient flow within the adhesive that an adequate transfer from the spreader rolls to the paper web may be obtained and so that the desirable strong and waterproof bond to the veneer is possible.

In most of the prior art adhesives used for paper-to-veneer bonding the adhesive materials have been either starch, or starch fortified with resins, or isolated protein materials. The starch adhesives are not particularly suitable because they require cooking during preparation and they do not provide sufficient water resistance unless fortified with an excessive amount of resin. High resin fortification slows the cure rate of the adhesive and, of course, materially adds to the cost of the adhesive.

The particular machinery to which my adhesive is applicable comprises means establishing a line of edge-to-edge joined veneer sheets, or a continuous sheet of wood veneer, above and below which is deposited continuous facing sheets of kraft paper. Just prior to the merging of a web of paper with a face of the veneer, adhesive material is applied by roller means to the inner face of such paper web. The laminate assembly thus formed is passed between heated rolls, at about 20–55 feet per minute during which time the paper webs are pressed into intimate contact with the veneer, the veneer is flattened and straightened, and the bond is produced in the adhesive films. Paper-to-paper lamination occurs at about 300 feet per minute.

The adhesive of the present invention is based on the use of spray dried animal blood in a formulation in which a high blood solids to water ratio is maintained. In such a formulation kaolin or china-clay is incorporated to not only reduce the cost through the extension of the blood adhesive base material, but also to improve mixing, to provide an extended pot life, and to control the flow characteristics of the adhesive during spreading and bonding.

Dried animal blood is produced commercially in several forms. The primary difference between various blood materials is the temperature employed during drying. Highly denatured blood is practically water insoluble and generally nondispersible in alkali. Such materials are unsuitable for the present invention. The animal bloods which are suitable in this invention are those which retain high solubility in water and are usually produced by spray drying. Bloods produced by other drying methods, of which vacuum drying is typical, are likewise suitable, so long as the water solubility is retained at a high level. In general it may be stated that suitable animal bloods of high water solubility are those in which there is substantially no denaturation of the protein. I have found that my best results are obtained with substantially undenatured spray dried soluble blood having a water solubility above about 90% and preferably those above about 92% to about 95%. Excellent results have been attained by using mixtures of equal parts of spray dried beef and hog blood. In general all-beef blood formulations are likewise satisfactory.

In its broader aspects my novel method of forming or producing a suitable laminating adhesive for the purposes mentioned above comprises forming an aqueous mixture of a substantially undenatured spray dried soluble blood and china-clay, in which the clay varies between about 30% and about 90% of the weight of the blood solids and the water varies between about 110% and about 250% of the weight of the blood solids. This aqueous dispersion is stirred to uniform consistency. Due to the high solubility of the blood, foaming may occur and must be abated through addition of a suitable defoamer simultaneously with the stirring or agitation of the dispersion. Thereafter the mixture has an alkaline material added to adjust its pH to between about 8 and about 10.3 to produce the glue. The alkaline material is preferably one selected from the group consisting of sodium silicate, sodium hydroxide and trisodium phosphate and mixtures thereof. It will be noted that I employ a low alkalinity for glues of this type.

Kaolin or china-clay provides full control and extension of the adhesive. This material has been found to be uniquely useful in this respect in that it controls the degree of glue penetration into the paper as well as into the wood, and insures that the essential glue ingredients remain at the glue line where the effective bond is obtained. The clay also functions to control adhesive bonding. For instance the use of clay not only provides extension of the glue, i.e. reduces blood content, but it also controls the bonding rate of the adhesive and tends to slow bonding to avoid premature adhesion of the laminates before the veneers have been flattened and the skins properly stretched.

While I have described above that the kaolin or clay may be added with the blood to the water this is immaterial as it is possible to add the clay to the blood-water solution after the same has been made alkaline. From a commercial standpoint it is preferable that the dry blood, clay and an anti-foam material be brought together to form a dry glue base. On occasion through the use of non-hygroscopic alkaline salts the alkali material may likewise be premixed with the other dry ingredients.

Alkali-protein solutions when agitated often produce a tenacious foam which is not only detrimental to proper glue formulation but interferes with the spreading of the adhesive and the production of uniform glue films. The abatement of such foam is obtainable through the incorporation of a small amount of pine oil to either the dry glue base or alternatively during the wet mixing preparation of the glue. In addition to pine oil there are proprietory foam abating materials which may be used.

Occasionally it is desirable to incorporate a fungicidal agent to protein glues to inhibit the growth of destructive fungi or molds at the glue line. These fungicidal materials may be either added to a dry glue premix or may be incorporated in a wet glue just prior to the completion of the formulation.

A further desirable characteristic for the laminating purposes mentioned herein is that the glue maintains a relatively flat viscosity curve over a protracted period of time. This generally referred to as "pot-life." In this specific instance, where the viscosity is measured on a MacMichael Viscometer rotating at 20 r.p.m. using a No. 26 wire, it can be stated that the initial viscosity range should be between about 10 and about 70 MacMichael units. The viscosity will gradually increase with time. The glue is adhesively useful over a wide range of viscosities being limited only as to when gelation occurs which of course interferes with pumping and spreading. The viscosities mentioned are particularly low, bearing in mind the high blood and clay solids content relative the water ratio as indicated.

The following are examples of typical glue formulations.

EXAMPLE I

| Ingredients: | Parts by weight |
|---|---|
| Water at 25° C. | 500 |
| to which add | |
| China-clay (kaolin) | 276 |
| Spray dried soluble blood (93% soluble in $H_2O$) | 312 |
| Pine oil (mix 10 minutes to uniform dispersion) | 12 |
| to which add | |
| N-Grade sodium silicate solution mixed 10 minutes | 30 |
| to which add | |
| Water at 25° C. to adjust the glue viscosity to between 27–35 MM., about | 100 |

In Example I the clay is 88% of the blood solids and the water is 192% of the blood solids. The silicate produces pH 9.5. This glue will remain fluid for a protracted period of time in excess of six hours when held at room temperature.

After formulation, a glue according to Example I was spread on 42-lb. kraft linerboard skins at the rate of 20 pounds of glue per thousand feet. The spreading rate may vary 25% more or less for suitable bonds. The skins were placed in opposition to each other at opposite faces of a single piece of 7" x 7" fir veneer. An additional piece of 90 lb. linerboard was placed between the platen and the linerboard to be bonded to reduce the heat transfer rate. The test assemblies were then placed in a hot platen press in which the temperature of the hot platen was 250° C. at pressures between about 10–20 p.s.i. in simulation of the laminating machine described above. Such machines employ hot rolls that intermittently momentarily contact the laminate. For purposes of the test being described, the press was closed for one second with sufficient pressure to obtain paper-veneer contact and thereafter immediately opened or breathed for four seconds. This comprised a cycle. It was found that when the glue of Example I was subjected to three cycles substantial paper and/or wood fiber failure was achieved.

EXAMPLE II

A glue Mix A was formulated as follows:

| Ingredients: | Parts by weight |
|---|---|
| Water at 25° C. | 700 |
| Clay | 180 |
| Spray dried soluble blood | 600 |
| Pine oil | 24 |
| Sodium hydroxide (8.4% solution) | 32 |

The water, clay, blood and pine oil ingredients were placed in a mixing vessel and stirred to uniform consistency. Whereupon the pH was adjusted by the addition of the sodium hydroxide to 8.0. The initial viscosity was 26 MacMichael units on a No. 26 wire at 20 r.p.m. The clay content by weight is 30% of the weight of the blood solids and the total water is approximately 121% of the blood solids by weight.

A second glue Mix B was produced from a portion of Mix A by adding sufficient sodium hydroxide to adjust the pH to 10.3 whereupon the initial viscosity was 48 MacMichael units on a No. 26 wire at 20 r.p.m.

A third Mix C was also produced from a portion of Mix A by adding sufficient sodium hydroxide to adjust the pH to 10.9. The initial viscosity was 130 MacMichael units.

Mixes A, B and C were allowed to stand and viscosity was periodically checked to determine the changes occurring with time.

Table A

| MIX | pH | Initial Viscosity | | | | | | |
|---|---|---|---|---|---|---|---|---|
| A—Elapsed time | 8.0 | 26 | 38 | 69 | 69 | 79 | 86 | 96 |
| | ------ | 0 | 90′ | 157′ | 217′ | 295′ | 405′ | 520′ |
| B—Elapsed time | 103. | 48 | 70 | 86 | 95 | 108 | 165 | 180 |
| | ------ | 0 | 35′ | 97′ | 167′ | 243′ | 350′ | 467′ |
| C—Elapsed time | 10.9 | 130 | 360 | Gelled | ------ | ------ | ------ | ------ |
| | ------ | 0 | 25 | 85 | ------ | ------ | ------ | ------ |

In the accompanying drawing Figure 1 is a graph illustrating the viscosity curves of the three mixes of Table A.

From Figure 1 and Table A it is to be noted that with glue formulations having a pH adjusted to between about 8.0 and about 10.3 the glues have a protracted pot life in excess of eight hours. On the other hand a glue mix having a pH 10.9 clearly evidences no practical pot life at all because gelation occurred within one hour. This abrupt decrease in pot life occurs slightly above pH 10.3 and results in an unspreadable material that is not adapted to spreading at the desirable high speeds of the laminating practices to which this adhesive is adapted.

EXAMPLE III

A dry glue base is prepared by intimately mixing the following dry ingredients in the proportions shown:

| Ingredients: | Parts by weight |
|---|---|
| Kaolin (water washed) | 258 |
| Spray dried soluble blood (93% water soluble) | 306 |
| Tri-sodium phosphate | 21 |
| Mix thoroughly, and while mixing spray in— | |
| Pine Oil | 12 |

Mix until all particles are uniformly coated with oil.

A wet glue is prepared from the dry glue base in the following manner:

500 parts of water 23°–25° C. is placed in a glue mixing vessel and 600 parts of dry glue, as described above, is added. The mixture should be stirred for ten minutes. To adjust viscosity, up to 25 parts of water may then be added. It will be found that the pH is approximately 9.5, and that the initial viscosity of the resulting glue formulation is between about 10 and about 60 MM. units on a No. 26 wire, using a MacMichael Viscometer at 20 r.p.m. This viscosity will of course increase with time and initially varies with bloods from different sources.

I have determined that the clay extension of such adhesive may vary between about 30% and about 90% based on the weight of the blood. With a 30% clay extension the water may be approximately 110 to 150% of the blood solids by weight within the pH range of about 8.0 to about 10.3. A 90% clay extension permits water up to 250% of the blood solids by weight.

No heat is employed in the formulation of this glue. The water is normally added at available temperatures, which are approximately 20°–25° C. No heat is applied to the glue during formulation. This is important in this blood glue in order to avoid uncontrollable gelation due to the denaturation of the soluble blood components. On the other hand the glue is capable of rapid gelation when it is subjected to heat in the wet glue line between the core material, be it a veneer or a cardboard, and the opposing paper faces being laminated thereto. This rapid gelation produces instantaneous bonding. A spray dried soluble blood glue having a high blood solids content relative the water content is entirely practical for these laminating purposes because it is rapid-setting and produces, when set, a very highly water resistant bond. The addition of well known fungicidal materials commonly used in the laminating art will insure protection of the glue bond against deterioration from fungi.

Changes and alteration in the method and formulas herein described may be made within the skill of the art. Those equivalents which fairly fall within the spirit of this invention as defined by the appended claims are covered hereby.

Having thus described my invention, I claim:

[1. The method of making a high speed, heat settable glue for paper-to-paper and paper-to-wood laminating, comprising: forming an aqueous mixture of a substantially undenatured spray dried soluble blood and china clay in which the clay varies between about 30% and about 90% of the weight of the blood solids, and the water varies between about 110% and about 250% of the weight of the blood solids; stirring said mixture to uniform consistency while simultaneously abating foaming; adjusting the pH of said mixture, by the addition of an alkaline material selected from the group consisting of sodium silicate, sodium hydroxide, and trisodium phosphate and mixtures thereof, to between about 8 and about 10.3 to produce a glue having a protracted pot-life; and maintaining the glue temperature at approximate room temperature at all times until spread between lamina to be bonded.]

[2. The method of claim 1 in which the pH adjustment is obtained by adding sodium silicate.]

[3. The method of claim 1 in which the pH adjustment is obtained by adding sodium hydroxide.]

[4. The method of claim 1 in which the pH adjustment is obtained by adding trisodium phosphate.]

5. An aqueously dispersible dry glue base, *consisting essentially of* [comprising]: a mixture of substantially undenatured [spray] dried, *water*-soluble blood and [china clay] *kaolin* in which the [clay] *kaolin* varies between about 30% and about 90% of the weight of the blood solids; a foam abating material; and [an alkali selected from the group consisting of sodium silicate, sodium hydroxide, and trisodium phosphate] *a non-hygroscopic alkaline salt* in an amount to produce a pH between about 8 and about 10.3 when the dry glue base is dispersed in water to an initial viscosity of between 10 and 70 MacMichael units on a No. 26 wire at 20 r.p.m.

6. A high speed, heat settable laminating adhesive, *consisting essentially of* [comprising]: a dispersion of 500 parts of water at temperatures of about 23°–25° C., 276 parts of [china clay] *kaolin*, 312 parts of a substantially undenatured spray dried, *water*-soluble blood, a foam abating material, and sodium silicate solution in an amount to produce a pH of between about 8 and about 10.3, said adhesive having an initial viscosity of about 10 to 70 MacMichael units on a No. 26 wire at 20 r.p.m. and incapable of becoming non-spreadable in about six hours at approximately room temperature.

7. An aqueously dispersible dry adhesive base mix *consisting essentially of* [comprising]: kaolin and spray dried, *water*-soluble blood in the proportion of between about 30 and about 90 parts of kaolin to 100 parts of the blood solids, solid tri-sodium phosphate in an amount to produce a pH in aqueous dispersion of between about 8.0 and 10.3, and a foam abating material.

8. The wet adhesive product formed by aqueously dispersing the adhesive base of claim 7 at room temperature to an initial viscosity of about 10 to 70 MacMichael units on a No. 26 wire at 20 r.p.m.

*9. The method of making a high speed, heat settable glue for paper-to-paper and paper-to-wood laminating comprising, uniformly dispersing in water a substantially undenatured dried water-soluble blood, kaolin and alkaline material, said water being present in an amount between about 110% and about 250% of the weight of the blood solids, said kaolin being present in an amount between about 30% and about 90% of the weight of the blood solids and said alkaline material being present in an amount to provide a pH between about 8 and about 10.3, said dispersing operation being effected without substantial addition of heat to avoid uncontrollable gelation.*

*10. A method as recited in claim 9 in which a foam abating agent is present in said water to preclude undesirable foaming during said dispersing operation.*

*11. A method as recited in claim 9 in which said alkaline material is added to a uniform dispersion of the remaining components specified to adjust the pH within the range specified and said water-soluble blood is a spray dried product soluble in water to an extent of at least about 90%.*

*12. A high speed, heat settable laminating adhesive consisting essentially of an aqueous dispersion of a substantially undenatured dried water-soluble blood, kaolin and alkaline material, said water being present in an amount between about 110% and about 250% of the weight of the blood solids, said kaolin being present in an amount between about 30% and about 90% of the weight of the blood solids and said alkaline material being present in an amount to provide a pH between about 8 and about 10.3.*

*13. A high speed, heat settable laminating adhesive as recited in claim 12 in which said alkaline material is selected from the group consisting of sodium silicate, sodium hydroxide, and trisodium phosphate and mixtures thereof.*

*14. A high speed, heat settable laminating adhesive as recited in claim 12 in which said adhesive has a viscosity measured at the time of initial preparation of about 10 to about 70 MacMichael units on a No. 26 wire at 20 r.p.m.*

*15. A high speed, heat settable laminating adhesive as recited in claim 12 in which said adhesive includes a foam abating material.*

(References on following page)

References Cited in the file of this patent or the original patent

UNITED STATES PATENTS

| | | |
|---|---|---|
| 1,976,436 | Cone | Oct. 9, 1934 |
| 2,350,953 | Bain et al. | June 6, 1944 |
| 2,400,541 | Cone | May 21, 1946 |
| 2,413,007 | Srere | Dec. 24, 1946 |
| 2,524,309 | Coyne | Oct. 3, 1950 |
| 2,620,280 | Fencil et al. | Dec. 2, 1952 |
| 2,874,134 | Gossett et al. | Feb. 17, 1959 |